(12) United States Patent
Ihm et al.

(10) Patent No.: US 8,331,218 B2
(45) Date of Patent: Dec. 11, 2012

(54) COMMUNICATING NON-COHERENT DETECTABLE SIGNAL IN BROADBAND WIRELESS ACCESS SYSTEM

(75) Inventors: Bin Chul Ihm, Anyang-si (KR); Jin Young Chun, Seoul (KR); Yong Suk Jin, Anyang-si (KR)

(73) Assignee: LG Electronics Inc., Seoul (KR)

( * ) Notice: Subject to any disclaimer, the term of this patent is extended or adjusted under 35 U.S.C. 154(b) by 426 days.

(21) Appl. No.: 12/788,653

(22) Filed: May 27, 2010

(65) Prior Publication Data

US 2010/0254339 A1    Oct. 7, 2010

Related U.S. Application Data

(63) Continuation of application No. 12/487,506, filed on Jun. 18, 2009, now Pat. No. 7,768,903, which is a continuation of application No. 11/319,251, filed on Dec. 27, 2005, now Pat. No. 7,573,806.

(30) Foreign Application Priority Data

Dec. 27, 2004 (KR) .................. 10-2004-0112990
Jan. 10, 2005 (KR) .................. 10-2005-0002266
Apr. 28, 2005 (KR) .................. 10-2005-0035405

(51) Int. Cl.
*H04J 11/00* (2006.01)

(52) U.S. Cl. .................................... 370/208

(58) Field of Classification Search .............. 370/208
See application file for complete search history.

(56) References Cited

U.S. PATENT DOCUMENTS

| | | |
|---|---|---|
| 2004/0151255 A1 | 8/2004 | Riazi et al. |
| 2004/0246888 A1 | 12/2004 | Peron |
| 2005/0286408 A1 | 12/2005 | Jin et al. |
| 2006/0120470 A1 | 6/2006 | Hwang et al. |
| 2007/0263735 A1 | 11/2007 | Tong et al. |
| 2009/0323615 A1 | 12/2009 | Ihm et al. |

(Continued)

FOREIGN PATENT DOCUMENTS

JP    2000-286816    10/2000

(Continued)

OTHER PUBLICATIONS

Ma, et al., "CQICH Based UL Channel Sounding", IEEE 802.16 Broadband Wireless Access Working Group, IEEE C802.16e-04/514, Nov. 4, 2004.

(Continued)

*Primary Examiner* — Melvin Marcelo
(74) *Attorney, Agent, or Firm* — Lee, Hong, Degerman, Kang & Waimey

(57) ABSTRACT

The present invention relates to allocating a radio resource in a wireless communication system utilizing orthogonal frequency division multiplexing (OFDM). Preferably, the present invention comprises receiving in a mobile station data associated with a radio resource allocation map from a base station, wherein the radio allocation map comprises control parameters for transmitting an uplink channel, wherein the uplink channel comprises at least one OFDM tile comprising a first set of subcarriers associated with representing at least part of an n-bit data payload, and a second set of subcarriers associated with representing at least part of a non-pilot m-bit data payload wherein each subcarrier carries a modulated data, and the first and the second set of subcarriers are exclusive to each other, and transmitting the uplink channel from the mobile station to the base station.

14 Claims, 8 Drawing Sheets

U.S. PATENT DOCUMENTS

2010/0056067 A1\* 3/2010 Kim et al. .................. 455/69

FOREIGN PATENT DOCUMENTS

| JP | 2003304215 | 10/2003 |
|---|---|---|
| JP | 2003304216 | 10/2003 |
| JP | 2004096186 | 3/2004 |
| JP | 2004-236335 | 8/2004 |
| KR | 1020050114160 | 12/2005 |
| TW | 2004-21766 | 10/2004 |
| TW | 2004-23580 | 11/2004 |
| WO | 02/05506 | 1/2002 |
| WO | 02/49306 | 6/2002 |
| WO | 2002-049306 | 6/2002 |
| WO | 2004-039114 | 5/2004 |
| WO | 2004/042949 | 5/2004 |
| WO | 2004/093365 | 10/2004 |
| WO | 2005-022792 | 3/2005 |

OTHER PUBLICATIONS

Yaniv, et al., "Corrections to definitions of Uplink MIMO in OFDMA PHY", IEEE C802.16 Broadband Wireless Access Working Group, IEEE C802.16maint-04/68r1, Nov. 13, 2004.

Byun, et al., "FAST_FEEDBACK Channel Codeword Extension", IEEE 802.16 Broadband Wireless Access Working Group, IEEE C802.16e-04/126r3, Aug. 17, 2004.

Lim, et al., "CQI Signaling with Unequal Error Protection for OFDMA", IEEE 802.16 Broadband Wireless Access Working Group, IEEE C802.16e-04/116r3, Jul. 8, 2004.

Lim, et al., "Aggregated H-ARQ", IEEE 802.16 Broadband Wireless Access Working Group, IEEE C802.16e-04/525, Nov. 4, 2004.

Byun, et al., "UL ACK Channel Enhancement", IEEE 802.16 Broadband Wireless Access Working Group, IEEE C802.16e-04/127r1, Jul. 8, 2004.

G. Lim et al., "Aggregated H-ARQ", IEEE 802.16 Broadband Wireless Access Working Group, IEEE C802.16e-04/525, Nov. 2004.

R. Yaniv et al., "Corrections to definitions of Uplink MIMO in OFDMA PHY", IEEE 802.16 Broadband Wireless Access Working Group, IEEE C802.16maint-04/68r1, Nov. 2004.

K. Lim et al., "CQI Signaling with Unequal Error Protection for OFDMA", IEEE 802.16 Broadband Wireless Access Working Group, IEEE C802.16e-04/116r3, Jul. 2004.

J. Ma et al., "CQICH Based UL Channel Sounding", IEEE 802.16 Broadband Wireless Access Working Group, IEEE C802.16e-04/514, Nov. 2004.

M. K. Byun et al., "FAST_FEEDBACK Channel Codeword Extension", IEEE 802.16 Broadband Wireless Access Working Group, IEEE C802.16e-04/126r3, Aug. 2004.

M. K. Byun et al., "UL ACK Channel Enhancement", IEEE 802.16 Broadband Wireless Access Working Group, IEEE C802.16e-04/127r1, Jul. 2004.

Yigal Leiba et al., "Enhancements to fast feedback sub-channel", IEEE 802.16 Broadband Wireless Access Working Group, IEEE C802.16d-04/87, Apr. 2004.

A.A. Nutter et al., "Channel Estimation for Mobile OFDM Systems," 50th Vehicular Technology Conference, vol. 1, pp. 305-309, Sep. 1999.

W. Ying et al., "Two-Dimensional Resource Allocation for OFDM/TDMA Microcellular Networks," 60th Vehicular Technology Conference, vol. 5, pp. 3452-3456, Sep. 2004.

\* cited by examiner

☐ CQICH

▦ Additional ACKCH or secondary CQICH

☐ ACKCH

▦ Additional ACKCH

☐ Additional CQICH
▦ CQICH

☐ Additional CQICH
▦ ACKCH

Transmitter unit

Receiver unit

COMMUNICATING NON-COHERENT DETECTABLE SIGNAL IN BROADBAND WIRELESS ACCESS SYSTEM

CROSS-REFERENCE TO RELATED APPLICATIONS

This application is a continuation of U.S. application Ser. No. 12/487,506, filed Jun. 18, 2009 now U.S. Pat. No. 7,768,903, issued Aug. 3, 2010, which is a continuation of U.S. application Ser. No. 11/319,251, filed Dec. 27, 2005, now U.S. Pat. No. 7,573,806, issued Aug. 11, 2009, which pursuant to 35 U.S.C. §119(a) claims the benefit of earlier filing date and right of priority to Korean Application No. 10-2004-0112990, filed on Dec. 27, 2004, Korean Application No. 10-2005-0002266, filed on Jan. 10, 2005, and Korean Application No. 10-2005-0035405, filed on Apr. 28, 2005, the contents of which are hereby incorporated by reference herein in their entirety.

FIELD OF THE INVENTION

The present invention relates to a broadband wireless access system, and more particularly, to communicating a non-coherent detectable signal for use in an orthogonal frequency division multiplexing (OFDM) access system.

BACKGROUND OF THE INVENTION

In order to enable a plurality of users to simultaneously use limited radio resources, a multiplexing scheme is required. The multiplexing scheme divides a single line or transmission path into a plurality of channels capable of simultaneously transmitting/receiving individual independent signals. There are a variety of multiplexing schemes, for example, a Frequency Division Multiplexing (FDM) scheme for dividing a single line into a plurality of frequency bands and performing signal multiplexing, and a Time Division Multiplexing (TDM) scheme for dividing a single line into a plurality of very short time intervals and performing signal multiplexing.

Currently, due to the increasing demands of multimedia data in mobile communication, a multiplexing method for effectively transmitting a large amount of data is required. A representative multiplexing method is an orthogonal frequency division multiplexing (OFDM) scheme.

The OFDM scheme is indicative of a digital modulation scheme capable of improving a transfer rate per bandwidth and preventing multi-path interference from being generated. The OFDM scheme is characterized in that it acts as a multi-sub-carrier modulation scheme using a plurality of sub-carriers, wherein individual sub-carriers are orthogonal to each other. Therefore, although frequency components of individual sub-carriers overlap with each other, the OFDM scheme is problem free. The OFDM scheme can perform multiplexing of many more sub-carriers than those of a general frequency division multiplexing (FDM) scheme. Thus, high frequency use efficiency is implemented.

A mobile communication system based on the above-mentioned OFDM scheme currently uses a variety of multiple access schemes capable of allocating radio resources to a plurality of users, for example, an OFDM-FDMA (OFDMA) scheme, an OFDM-TDMA scheme, and an OFDM-CDMA scheme, etc. Specifically, the OFDMA (Orthogonal Frequency Division Multiple Access) scheme allocates some parts of all sub-carriers to individual users, such that it can accommodate a plurality of users.

FIG. 1 illustrates a method for allocating radio resources in accordance with the related art. Referring to FIG. 1, a broadband wireless access system comprises a specific configuration of FIG. 1 as a basic unit for allocating OFDMA uplink radio resources. This specific configuration shown in FIG. 1 is referred to as a tile structure. In the case of the above-mentioned tile structure, data of a Channel Quality Indication Channel (CQICH) or data of an Acknowledge Channel (ACKCH) is transmitted via a plurality of data sub-carriers 102, 103, 105, 106, 107, 108, 110, and 111. A pilot channel is transmitted via pilot sub-carriers 101, 104, 109, and 112. Each sub-carrier transmitted via the tile structure is referred to as a constituent unit of the tile structure.

SUMMARY OF THE INVENTION

The present invention is directed to communicating a non-coherent detectable signal for use in an orthogonal frequency division multiplexing (OFDM) access system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of allocating a radio resource in a wireless communication system utilizing orthogonal frequency division multiplexing (OFDM), the method comprising receiving in a mobile station data associated with a radio resource allocation map from a base station, wherein the radio allocation map comprises control parameters for transmitting an uplink channel, wherein the uplink channel comprises at least one OFDM tile comprising a first set of subcarriers associated with representing at least part of an n-bit data payload, and a second set of subcarriers associated with representing at least part of a non-pilot m-bit data payload wherein each subcarrier carries a modulated data, and the first and the second set of subcarriers are exclusive to each other, and transmitting the uplink channel from the mobile station to the base station.

Preferably, the uplink channel comprises a primary tile comprising the following Table 1A.

TABLE 1A

|  | Subcarrier 0 | Subcarrier 1 | Subcarrier 2 | Subcarrier 3 |
| --- | --- | --- | --- | --- |
| Symbol 0 | NULL | Mn, 8m | Mn, 8m + 1 | NULL |
| Symbol 1 | Mn, 8m + 2 | Mn, 8m + 3 | Mn, 8m + 4 | Mn, 8m + 5 |
| Symbol 2 | NULL | Mn, 8m + 6 | Mn, 8m + 7 | NULL |

Table 1A can be depicted in a drawing format like FIG. 10A, wherein an x-axis represents a time domain and a y-axis represents a frequency domain.

Preferably, the uplink channel further comprises a secondary tile comprising the following Table 1B.

TABLE 1B

|  | Subcarrier 0 | Subcarrier 1 | Subcarrier 2 | Subcarrier 3 |
| --- | --- | --- | --- | --- |
| Symbol 0 | Mn, 4m | NULL | NULL | Mn, 4m + 1 |
| Symbol 1 | NULL | NULL | NULL | NULL |
| Symbol 2 | Mn, 4m + 2 | NULL | NULL | Mn, 4m + 3 |

Table 1B can be depicted in a drawing format like FIG. 10B, wherein an x-axis represents a time domain and a y-axis represents a frequency domain.

In one aspect of the invention, information associated with the use of one of the first and the second sets of subcarriers is received in the mobile station using a normal map information element.

In another aspect of the invention, information associated with the use of one of the first and the second sets of subcarriers is received in the mobile station using a HARQ map information element.

Preferably, the first set of subcarriers is associated with representing at least part of a 6-bit data payload. Preferably, the second set of subcarriers is associated with representing at least part of a 4-bit data payload.

In a further aspect of the invention, the uplink channel is associated with transmitting one of channel quality information, antenna selection option and precoding matrix code book.

Preferably, the uplink channel is associated with transmitting one of fast down link measurement, MIMO mode, antenna grouping, antenna selection, reduced codebook, quantized precoding weight feedback, index to precoding matrix in codebook, channel matrix information and per stream power control.

Preferably, the use of the second set of subcarriers for transmitting at least part of the m-bit data payload is requested by one of the base station or the mobile station.

Preferably, six OFDM tiles comprise one OFDM slot for representing a 4-bit data payload, wherein the 4-bit data payload is represented as follows:

| 4 bit payload | Vector indices per tile Tile(0), Tile(1), Tile(2), Tile(3), Tile(4), Tile(5) |
|---|---|
| 0b0000 | a, a, a, b, b, b |
| 0b0001 | b, b, b, a, a, a |
| 0b0010 | c, c, c, d, d, d |
| 0b0011 | d, d, d, c, c, c |
| 0b0100 | a, b, c, d, a, b |
| 0b0101 | b, c, d, a, b, d |
| 0b0110 | c, d, a, b, c, d |
| 0b0111 | d, a, b, c, d, a |
| 0b1000 | a, a, b, d, c, c |
| 0b1001 | b, d, c, c, d, b |
| 0b1010 | c, c, d, b, a, a |
| 0b1011 | d, d, b, a, b, b |
| 0b1100 | a, a, d, c, a, d |
| 0b1101 | b, c, a, c, c, a |
| 0b1110 | c, b, d, d, b, c |
| 0b1111 | d, c, c, b, b, c | wherein

| Vector Index | $M_{n,Am}$, $M_{n,Am+1}$, $M_{n,Am+2}$, $M_{n,Am+3}$ |
|---|---|
| A | P0, P0, P0, P0 |
| B | P0, P2, P0, P2 |
| C | P0, P1, P2, P3 |
| D | P1, P0, P3, P2 |

In accordance with another embodiment of the present invention, a method of allocating a radio resource in a wireless communication system utilizing orthogonal frequency division multiplexing (OFDM) comprises transmitting data associated with a radio resource allocation map to a mobile station, wherein the radio allocation map comprises control parameters for receiving an uplink channel, wherein the uplink channel comprises at least one OFDM tile comprising a first set of subcarriers associated with representing at least part of an n-bit data payload, and a second set of subcarriers associated with representing at least part of a non-pilot m-bit data payload wherein each subcarrier carries a modulated data, and the first and the second set of subcarriers are exclusive to each other, and receiving the uplink channel from the mobile station.

In accordance with another embodiment of the present invention, a mobile communication device for allocating a radio resource in a wireless communication system utilizing orthogonal frequency division multiplexing (OFDM) comprises a receiver for receiving data associated with a radio resource allocation map from a base station, wherein the radio allocation map comprises control parameters for transmitting an uplink channel, wherein the uplink channel comprises at least one OFDM tile comprising a first set of subcarriers associated with representing at least part of an n-bit data payload, and a second set of subcarriers associated with representing at least part of a non-pilot m-bit data payload wherein each subcarrier carries a modulated data, and the first and the second set of subcarriers are exclusive to each other, and a transmitter for transmitting the uplink channel from the mobile communication device to the base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
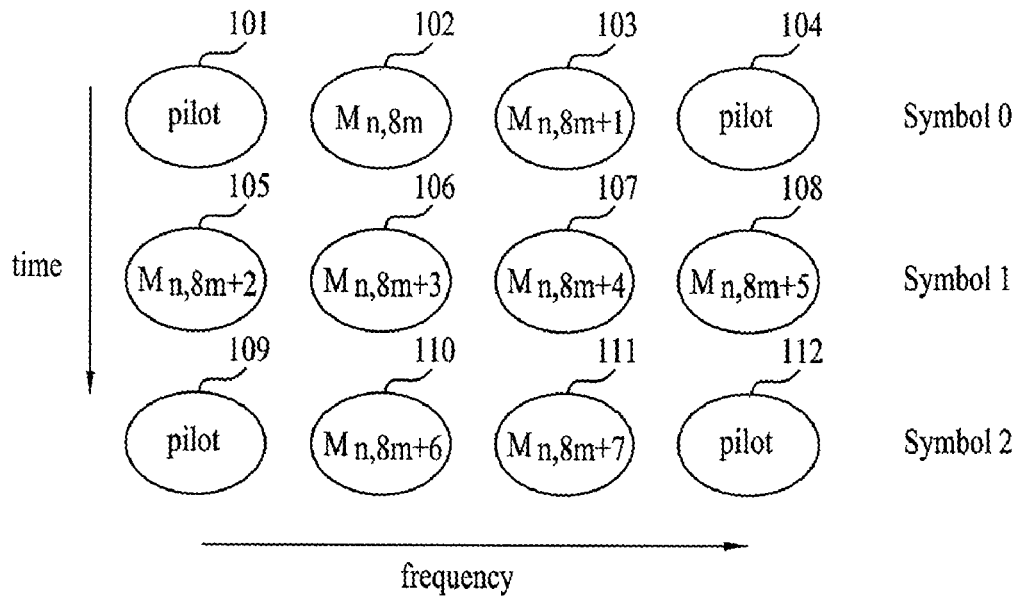
FIG. 1 illustrates a method for allocating radio resources in accordance with the related art.

The present invention relates to allocating a radio resource in a wireless communication system utilizing orthogonal frequency division multiplexing (OFDM).

Reference will now be made in detail to the preferred embodiments of the present invention, examples of which are illustrated in the accompanying drawings. Wherever possible, the same reference numbers will be used throughout the drawings to refer to the same or like parts.

Preferably, the present invention is applied to a broadband wireless access system, such as the system disclosed in IEEE 802.16e. However, it is contemplated that the present invention may be utilized in other types of wireless access systems.

Typically, channel estimation is performed on a data sub-carrier on the basis of the pilot sub-carrier, such that a coherent detection scheme is used for the data sub-carrier. However, an ACKCH or CQICH may use a non-coherent detection scheme without performing the channel estimation. In the meantime, the ACKCH or CQICH uses orthogonal codewords to implement a non-coherent detection scheme.

The following Table 1 exemplarily shows codewords for modulating ACKCH sub-carriers when ACK information of 1 bit is provided.

TABLE 1

| ACK 1-bit symbol | Vector indices per tile Tile(0), Tile(1), Tile(2) |
|---|---|
| 0 | 0, 0, 0 |
| 1 | 4, 7, 2 |

The following Table 2 exemplarily shows codewords for modulating CQICH sub-carriers when CQI information of 6 bits is provided.

TABLE 2

| 6-bit payload | Fast Feedback vector indices per tile Tile(0), Tile(1), . . . , Tile(5) |
|---|---|
| 0b000000 | 0, 0, 0, 0, 0, 0 |
| 0b000001 | 1, 1, 1, 1, 1, 1 |
| 0b000010 | 2, 2, 2, 2, 2, 2 |
| 0b000011 | 3, 3, 3, 3, 3, 3 |
| . | . |
| . | . |
| . | . |

The following Table 3 exemplarily shows codewords for modulating CQICH sub-carriers when CQI information of 5 bits is provided.

TABLE 3

| 5-bit payload | Fast Feedback vector indices per tile Tile(0), Tile(1), . . . , Tile(5) |
|---|---|
| 0b00000 | 0, 0, 0, 0, 0 |
| 0b00001 | 1, 1, 1, 1, 1 |
| 0b00010 | 2, 2, 2, 2, 2 |
| 0b00011 | 3, 3, 3, 3, 3 |
| . | . |
| . | . |
| . | . |

The following Table 4 exemplarily shows codewords for modulating CQICH sub-carriers when CQI information of 4 bits is provided.

TABLE 4

| 4-bit payload | Fast feedback vector indices per tile Tile(0), Tile(1), . . . , Tile(5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| . | . |
| . | . |
| . | . |

With reference to Table 4, a vector for each tile includes 8 Quadrature Phase Shift Keying (QPSK) symbols, such that a signal can be transmitted via 8 data sub-carriers.

TABLE 5

| Vector Index | $M_{n,n8}, M_{n,8m+1}, \ldots M_{n,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

With reference to Table 5, P0, P1, P2, and P3 are denoted by the following Equation 1:

$$P_0 = \exp\left(j\frac{\pi}{4}\right),$$
$$P_1 = \exp\left(j\frac{3\pi}{4}\right),$$
$$P_2 = \exp\left(-j\frac{3\pi}{4}\right),$$
$$P_3 = \exp\left(-j\frac{\pi}{4}\right)$$

[Equation 1]

A single sub-channel includes 6 tiles. The CQICH can use a single sub-channel, and the ACKCH can use half of the sub-channel. In other words, the CQICH can use 6 tiles, and the ACKCH can use 3 tiles.

Figure 2:
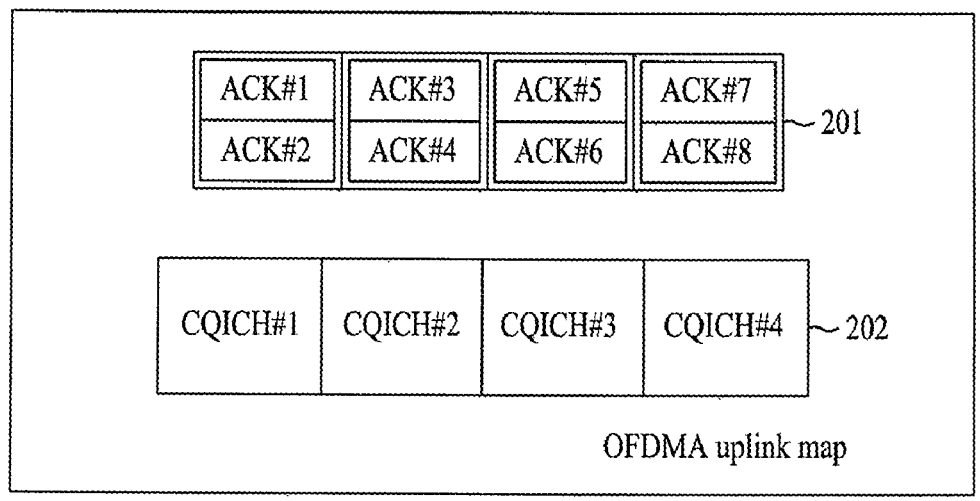
FIG. 2 illustrates a method for allocating a CQICH (Channel Quality Indication Channel) area and an ACKCH (Acknowledge Channel) area in an OFDM uplink in accordance with one embodiment of the present invention.

FIG. 2 illustrates a method for allocating a CQICH (Channel Quality Indication Channel) area and an ACKCH (Acknowledge Channel) area in an OFDM uplink in accordance with one embodiment of the present invention. Referring to FIG. 2, some areas of a two-dimensional map of an uplink are pre-assigned to the ACKCH dedicated area 201, and the remaining areas other than the above-mentioned areas are pre-assigned to the CQICH dedicated area 202.

Individual sub-channels are assigned to an ACKCH dedicated area 201 and a CQICH dedicated area 202, such that a specific Mobile Subscriber Station (MSS) can use the ACKCH dedicated area 201 and the CQICH dedicated area 202. Referring to FIG. 2, an MSS#1 may be assigned to an ACK#1, an MSS#2 may be assigned to an ACK#2, . . . , an MSS#8 may be assigned to an ACK#8, an MSS#9 may be assigned to a CQICH#1, an MSS#10 may be assigned to a CQICH#2 and a CQICH#3, and an MSS#11 may be assigned to a CQICH#4.

If a base station uses a non-coherent detection scheme, there is no need to use pilot sub-carriers. In this case, it is not necessary to use 4 pilot sub-carriers assigned to each tile, and the uplink's radio resources and terminal's transmission power are unnecessarily consumed.

Therefore, new information is loaded on a sub-carrier assigned to a pilot channel, and is then transmitted to the CQICH and ACKCH tile structures, such that specific information based on the non-coherent detection scheme in the same manner as in the CQICH or ACKCH can be transmitted using a conventional sub-carrier equipped with a pilot signal.

Figure 3:
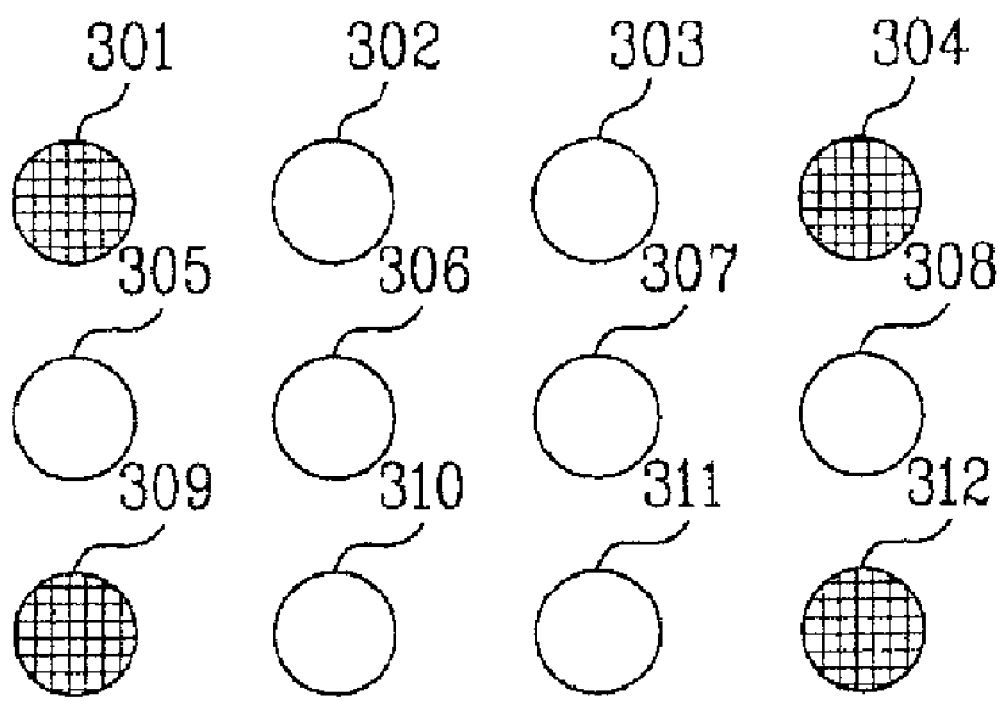
FIG. 3 illustrates a tile structure for when a new signal is transmitted using a sub-carrier having transmitted a pilot signal in accordance with one embodiment of the present invention.

FIG. 3 illustrates a tile structure for when a new signal is transmitted using a sub-carrier having transmitted a pilot signal in accordance with one embodiment of the present invention. Referring to FIG. 3, a new signal can be transmitted using sub-carriers 301, 304, 309, and 312. These sub-carriers used to transmit a pilot signal.

As stated above, if the new signal is loaded on the sub-carrier having transmitted the pilot signal in the tile structure for the CQICH and the ACKCH, the sub-carrier having transmitted each pilot signal is referred to as an additional sub-carrier. If the additional sub-carrier formed by the grouping of unit tile structures is used, a secondary CQICH and a secondary ACKCH other than a primary ACKCH and a primary CQICH can be acquired.

Figure 4:
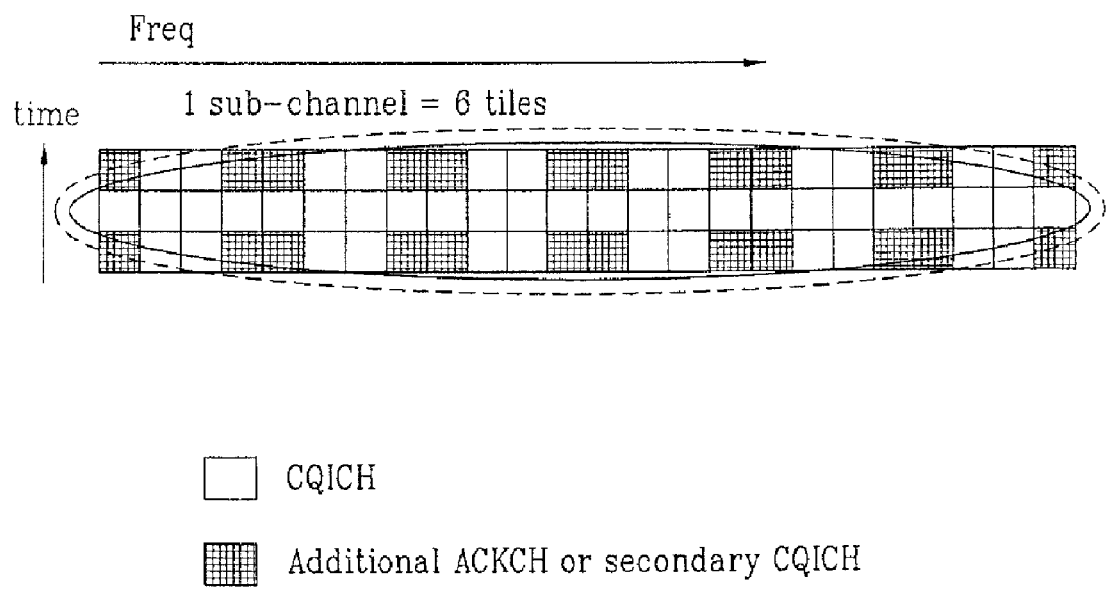
FIG. 4 illustrates a method for acquiring a secondary ACKCH from a CQICH tile structure in accordance with one embodiment of the present invention.

FIG. 4 illustrates a method for acquiring a secondary CQICH from a CQICH tile structure in accordance with one embodiment of the present invention. Referring to FIG. 4, a single CQICH includes 6 tile units (1 subchannel), wherein 4 additional sub-carriers may be acquired from each tile unit, such that a total of 24 additional sub-carriers may be acquired from each CQICH. Meanwhile, an ACKCH or a secondary CQICH may include 3 tile units (1/2 subchannel), wherein each tile unit includes 8 sub-carriers, such that a single ACKCH or a secondary CQICH may be constructed using 24 sub-carriers. Therefore, a single ACKCH (i.e., the secondary ACKCH) or a secondary CQICH may be constructed using 24 additional sub-carriers capable of being acquired from a single CQICH.

Figure 5:
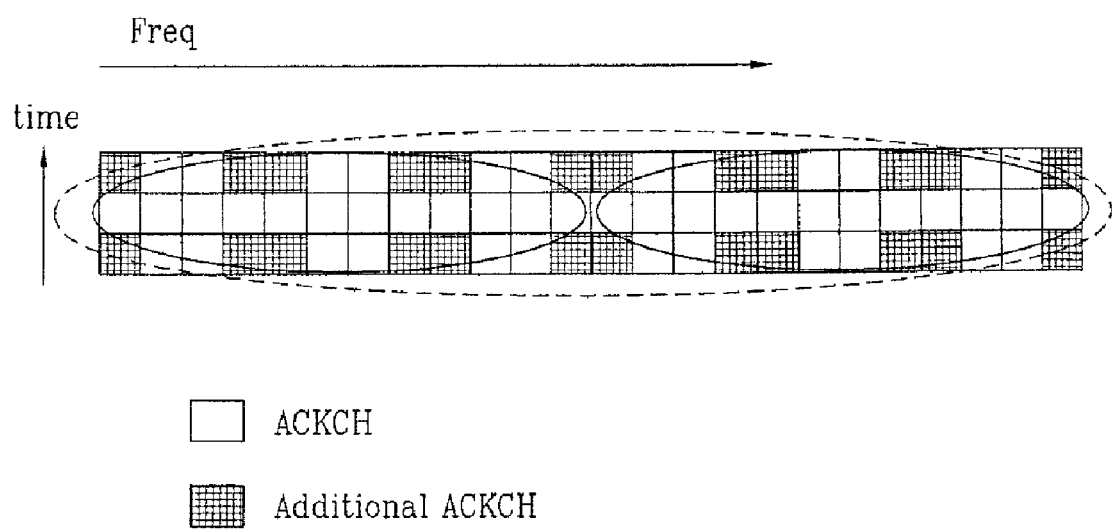
FIG. 5 illustrates a method for acquiring a secondary ACKCH from two ACKCH tile structures in accordance with one embodiment of the present invention.

FIG. 5 illustrates a method for acquiring a secondary ACKCH from two ACKCH tile structures in accordance with one embodiment of the present invention. Referring to FIG. 5, a single ACKCH may include 3 tile units, wherein 4 additional sub-carriers may be acquired from each tile unit, such that a total of 24 additional sub-carriers can be acquired from two ACKCHs. Meanwhile, a single ACKCH may be constructed using 24 sub-carriers, such that a single ACKCH (i.e., the secondary ACKCH) can be constructed when additional sub-carriers are acquired from a group comprising 2 ACKCHs, as shown in FIG. 5.

Figure 6:
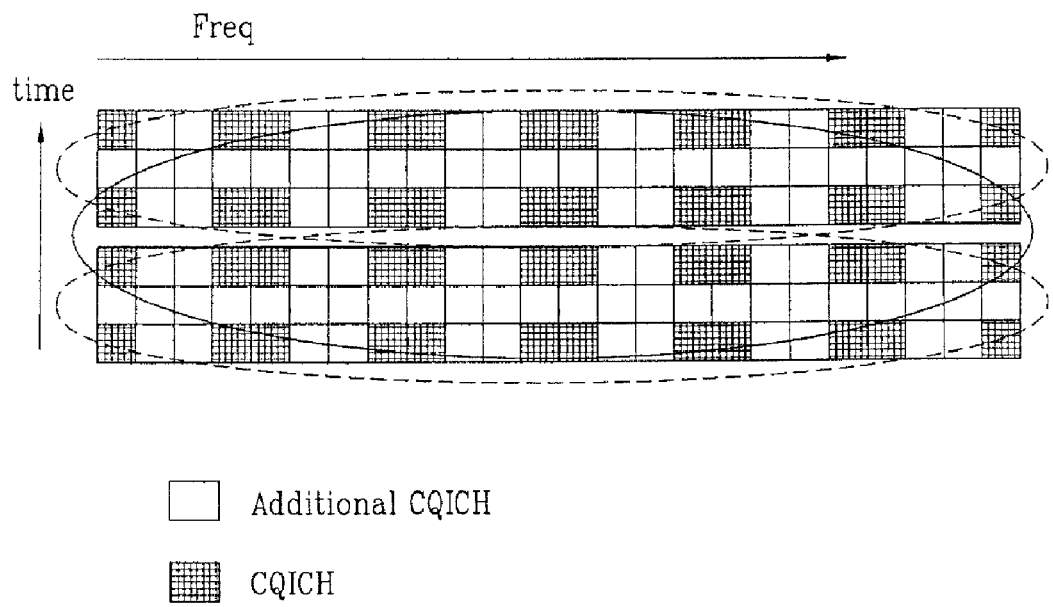
FIG. 6 illustrates a method for acquiring a secondary CQICH from two CQICH tile structures in accordance with one embodiment of the present invention.

FIG. 6 illustrates a method for acquiring a secondary CQICH from two CQICH tile structures in accordance with one embodiment of the present invention. Referring to FIG. 6, each CQICH may include 6 tile units, wherein 4 additional sub-carriers are acquired from each tile unit, such that a total of 48 additional sub-carriers may be acquired from two CQICHs. Meanwhile, a CQICH may also include 6 tile units, wherein each tile unit includes 8 sub-carriers, such that a single CQICH may be constructed using 48 sub-carriers. Therefore, a single CQICH (i.e., the secondary CQICH) may be constructed using 48 additional sub-carriers capable of being acquired from two CQICHs.

Figure 7:
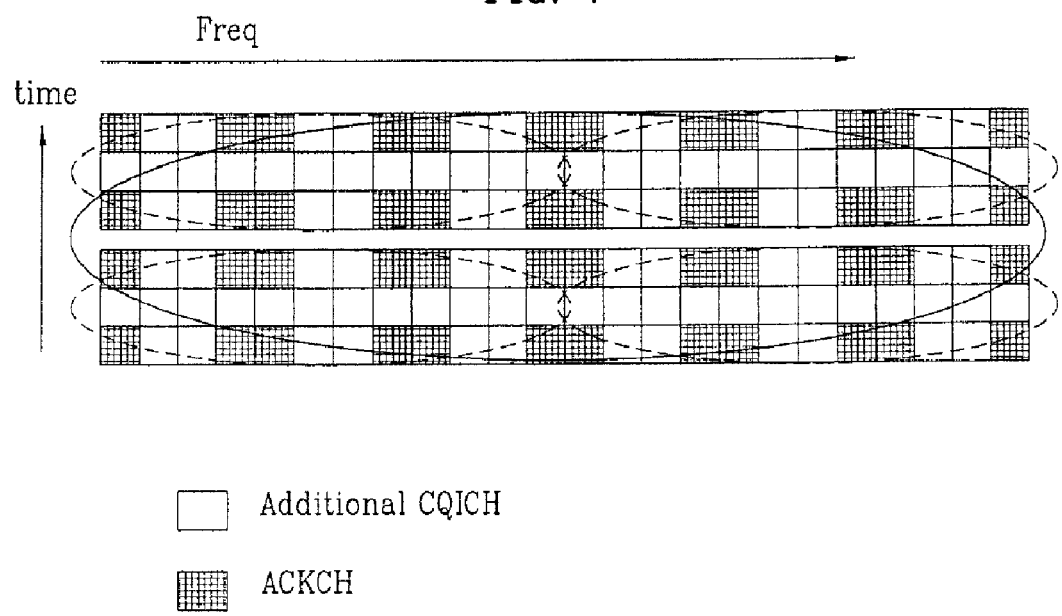
FIG. 7 illustrates a method for acquiring a secondary CQICH from four ACKCH tile structures in accordance with one embodiment of the present invention.

FIG. 7 illustrates a method for acquiring a secondary CQICH from four ACKCH tile structures in accordance with one embodiment of the present invention. Referring to FIG. 7, a single ACKCH may include 3 tile units, wherein 4 additional sub-carriers may be acquired from each tile unit, such that a total of 48 additional sub-carriers may be acquired from 4 ACKCHs. Meanwhile, a CQICH may include 6 tile units, wherein each tile unit includes 8 sub-carriers, such that a single CQICH may be constructed using 48 sub-carriers. Therefore, a single CQICH (i.e., the secondary CQICH) may be constructed using 48 additional sub-carriers capable of being acquired from 4 ACKCHs.

Preferably, the following methods can be adapted to assign a codeword to a sub-carrier. According to a first preferred embodiment of the present invention, 12 tiles contained in either a single CQICH or two ACKCHs are grouped into 6 sets, each of which comprises 2 tiles, and the codeword can be assigned, as shown in the following Tables 6-9.

The following Table 6 exemplarily shows a method for assigning a codeword to modulate a secondary ACKCH sub-carrier when ACK information of 1 bit is provided.

TABLE 6

| Additional ACKCH 1-bit symbol | Vector indices per tile (Tile(0), Tile(1)), (Tile(2), Tile(3)), (Tile(4), Tile(5)) |
| --- | --- |
| 0 | 0, 0, 0 |
| 1 | 4, 7, 2 |

The following Table 7 exemplarily shows a method for assigning a codeword to modulate a CQICH sub-carrier when CQI information of 6 bits is provided.

TABLE 7

| 6-bits payload | Fast Feedback vector indices per tile (Tile(0), Tile(1)), (Tile(2), Tile(3)), (Tile(4), Tile(5)), . . . (Tile(10), Tile(11)) |
| --- | --- |
| 0b000000 | 0, 0, 0, 0, 0, 0 |
| 0b000001 | 1, 1, 1, 1, 1, 1 |
| 0b000010 | 2, 2, 2, 2, 2, 2 |
| 0b000011 | 3, 3, 3, 3, 3, 3 |
| . | . |
| . | . |
| . | . |

The following Table 8 exemplarily shows a codeword for modulating a CQICH sub-carrier when CQI information of 5 bits is provided.

TABLE 8

| 5-bits payload | Fast Feedback vector indices per tile (Tile(0), Tile(1)), (Tile(2), Tile(3)), (Tile(4), Tile(5)), . . . (Tile(10), Tile(11)) |
| --- | --- |
| 0b00000 | 0, 0, 0, 0, 0 |
| 0b00001 | 1, 1, 1, 1, 1 |
| 0b00010 | 2, 2, 2, 2, 2 |
| 0b00011 | 3, 3, 3, 3, 3 |
| . | . |
| . | . |
| . | . |

The following Table 9 exemplarily shows a codeword for modulating a CQICH sub-carrier when CQI information of 4 bits is provided.

TABLE 9

| 4-bits payload | Fast Feedback vector indices per tile (Tile(0), Tile(1)), (Tile(2), Tile(3)), (Tile(4), Tile(5)), ... (Tile(10), Tile(11)) |
|---|---|
| 0b00000 | 0, 0, 0, 0, 0, 0 |
| 0b00001 | 1, 1, 1, 1, 1, 1 |
| 0b00010 | 2, 2, 2, 2, 2, 2 |
| 0b00011 | 3, 3, 3, 3, 3, 3 |
| . | . |
| . | . |
| . | . |

Meanwhile, according to a second preferred embodiment of the present invention, a codeword can be assigned to each of 12 tiles contained in either a single CQICH or two ACKCHs, as shown in the following Tables 10-11.

The following Table 10 exemplarily shows a method for assigning a codeword to modulate a secondary ACKCH sub-carrier when ACK information of 1 bit is provided.

TABLE 10

| additional ACK 1-bit symbol | Vector indices per tile Tile(0), Tile(1), Tile(2), Tile(3), Tile(4), Tile(5) |
|---|---|
| 0 | a, a, a, a, a, a |
| 1 | b, b, b, b, b, b |

TABLE 11

| additional CQICH 6-bits, 5-bits and 4-bits payload | Fast Feedback vector indices per tile Tile(0), Tile(1), Tile(2), Tile(3), Tile(4), Tile(5), ... Tile(10), Tile(11) |
|---|---|
| 0b000000, 0b00000, 0b0000 | a, a, a, a, a, a, a, a, a, a, a, a |
| 0b000001, 0b00001, 0b0001 | b, b, b, b, b, b, b, b, b, b, b, b |
| 0b000010, 0b00001, 0b0001 | c, c, c, c, c, c, c, c, c, c, c, c |
| 0b000011, 0b00011, 0b0011 | d, d, d, d, d, d, d, d, d, d, d, d |

Figure 8:
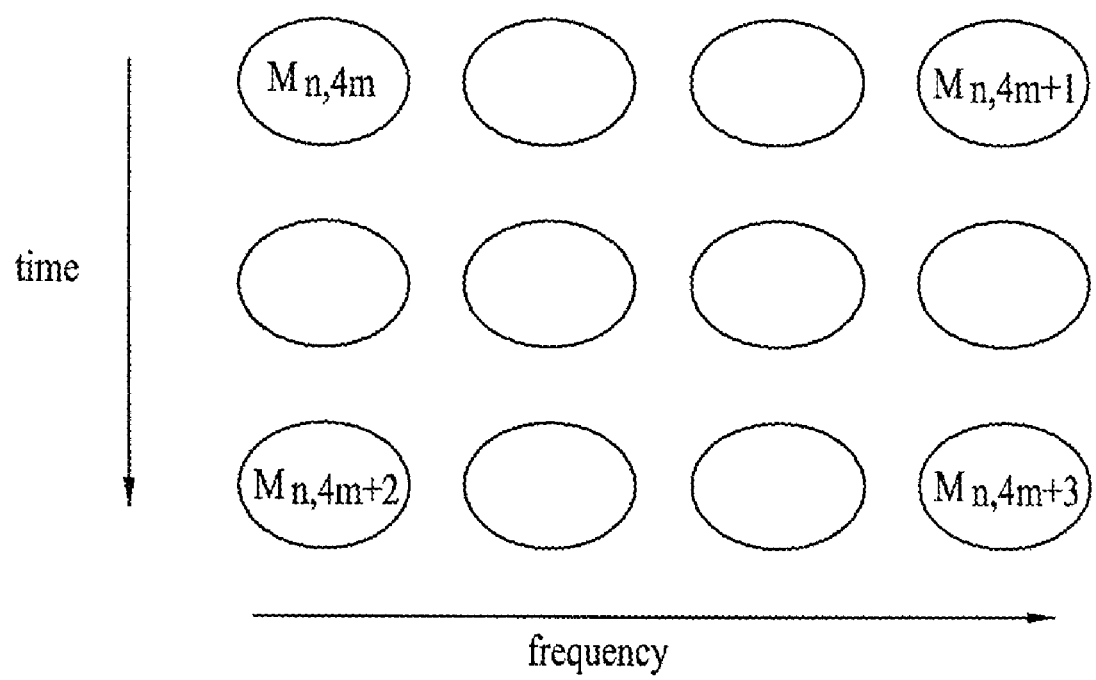
FIG. 8 illustrates a tile structure for use in a method for allocating a codeword using an additional sub-carrier in accordance with one embodiment of the present invention.

Additional sub-carriers of the tile applied to the codeword allocation shown in Table 11 are depicted in FIG. 8.

FIG. 8 illustrates a tile structure for use in a method for allocating a codeword using an additional sub-carrier in accordance with one embodiment of the present invention.

Referring to FIG. 8 and the following Table 12, a vector assigned to each tile includes 4 modulation symbols in order to perform signal transmission via 4 additional sub-carriers.

TABLE 12

| Vector Index | $M_{n,4m}, M_{n,4m+1}, M_{n,4m+2}, M_{n,4m+3}$ |
|---|---|
| a | P0, P0, P0, P0 |
| b | P0, P2, P0, P2 |
| c | P0, P1, P2, P3 |
| d | P1, P0, P3, P2 |

The secondary ACKCH can be constructed using 24 sub-carriers assigned to a pilot channel. A method for constructing the ACKCH using the 24 pilot sub-carriers can be implemented with additional sub-carriers in various ways other than exemplary methods shown in FIGS. 9-10.

The secondary ACKCH can be configured using 3 tiles. The following Table 13 exemplarily shows a codeword available for the above-mentioned case in which the secondary ACKCH includes 3 tiles.

TABLE 13

| Secondary ACK 1-bit symbol | Vector indices per tile Tile(0), Tile(1), Tile(2) |
|---|---|
| 0 | a, a, a |
| 1 | b, b, b |

The secondary CQICH can be constructed using 48 pilot sub-carriers. A method for constructing the ACKCH using the 48 pilot sub-carriers can be implemented with additional sub-carriers in various ways other than the exemplary methods shown in FIGS. 6-7.

The secondary CQICH can be configured using 6 tiles. The following Table 14 exemplarily shows a codeword available for the above-mentioned case in which the secondary CQICH includes 6 tiles.

TABLE 14

| Secondary CQICH 4 bit payload | Vector indices per tile Tile(0), Tile(1), Tile(2), Tile(3), Tile(4), Tile(5) |
|---|---|
| 0b0000 | a, a, a, b, b, b |
| 0b0001 | b, b, b, a, a, a |
| 0b0010 | c, c, c, d, d, d |
| 0b0011 | d, d, d, c, c, c |
| 0b0100 | a, b, c, d, a, b |
| 0b0101 | b, c, d, a, b, d |
| 0b0110 | c, d, a, b, c, d |
| 0b0111 | d, a, b, c, d, a |
| 0b1000 | a, a, b, d, c, c |
| 0b1001 | b, d, c, c, d, b |
| 0b1010 | c, c, d, b, a, a |
| 0b1011 | d, d, b, a, b, b |
| 0b1100 | a, a, d, c, a, d |
| 0b1101 | b, c, a, c, c, a |
| 0b1110 | c, b, d, d, b, c |
| 0b1111 | d, c, c, b, b, c |

Meanwhile, a new codeword can be constructed using binary phase-shift keying (BPSK), as shown in the following Table 15.

TABLE 15

| Vector Index | $M_{n,4m}, M_{n,4m+1}, M_{n,4m+2}, M_{n,4m+3}$ |
|---|---|
| a | 1, 1, 1, 1 |
| b | 1, −1, 1, −1 |
| c | 1, 1, −1, −1 |
| d | 1, −1, −1, 1 |

A base station can use messages shown in the following Table 16 to inform a mobile subscriber station (MSS) of information associated with the secondary ACKCH.

TABLE 16

| Syntax | Size(bits) | Notes |
|---|---|---|
| Compact_UL_MAP_IE( ){ | | |
|   UL-MAP Type | 3 | Type = 7 |
|   UL-MAP Sub-type | 5 | Sub-type = 3 |
|   Length | 4 | Length of the IE bytes |
|   Primary/Secondary H-ARQ Region Change Indication | 1 | 0 = no region change 1 = region change |
|   If(Primary/Secondary H-ARQ Region Change indication==1){ | | |
|     OFDMA Symbol Offset | 8 | |
|     Subchannel Offset | 8 | |

TABLE 16-continued

| Syntax | Size(bits) | Notes |
|---|---|---|
|     No. OFDMA Symbols | 8 | |
|     No. Subchannels | 8 | |
|   } | | |
|   Reserved | 3 | |
| } | | |

With reference to Table 16, the "UL-MAP TYPE" field and the "Sub-Type" field are adapted to inform an MSS of message type information. In other words, the MSS can recognize content information of a corresponding message by referring to the above-mentioned "UL-MAP TYPE" and "Sub-Type" fields. Meanwhile, the "Length" field informs the MSS of size information of overall messages including the "Length" field in byte units.

The "Primary/Secondary H-ARQ Region Indication" field has a value of 1 either when a current frame has an H-ARQ region different from that of a previous frame or when another H-ARQ region is present in the same frame. The "OFDMA Symbol Offset" field informs the MSS of coordinates at which the "H-ARQ" region begins at an uplink in symbol units. The "Subchannel Offset" field informs the MSS of coordinates at which the "H-ARQ" region begins at an uplink in sub-channel units. The "No. OFDMA symbols" field informs the MSS of size information occupied by the "H-ARQ" region at an uplink in symbol units. The "No. Sub-channels" field informs the MSS of size information occupied by the "H-ARQ" region at an uplink in subchannel units.

Meanwhile, a base station may use messages shown in the following Table 17 to inform the MSS of information associated with the secondary CQICH.

TABLE 17

| Syntax | Size(bits) | Notes |
|---|---|---|
| Compact_UL_MAP_IE( ){ | | |
|   UL-MAP Type | 3 | Type = 7 |
|   UL-MAP Sub-type | 5 | Sub-type = 3 |
|   Length | 4 | Length of the IE bytes |
|   Primary/Secondary H-ARQ Region Change Indication | 1 | 0 = no region change |
|   If(Primary/Secondary H-ARQ Region Change indication==1){ | | 1 = region change |
|     OFDMA Symbol Offset | 8 | |
|     Subchannel Offset | 8 | |
|     No. OFDMA Symbols | 8 | |
|     No. Subchannels | 8 | |
|   } | | |
|   Reserved | 3 | |
| } | | |

With reference to Table 17, the "UL-MAP TYPE" field and the "Sub-Type" field are adapted to inform the MSS of message type information. In other words, the MSS can recognize message content information by referring to the above-mentioned "UL-MAP TYPE" and "Sub-Type" fields. Meanwhile, the "Length" field informs the MSS of size information of overall messages including the "Length" field in byte units.

The "Primary/Secondary CQICH Region Indication" field has a value of 1 either when a current frame has a CQICH region different from that of a previous frame or when another CQICH region is present in the same frame. The "OFDMA Symbol Offset" field informs the MSS of coordinates at which the "CQICH" region begins at an uplink in symbol units. The "Subchannel Offset" field informs the MSS of coordinates at which the "CQICH" region begins at an uplink in subchannel units. The "No. OFDMA symbols" field informs the MSS of size information occupied by the "CQICH" region at an uplink in symbol units. The "No. Sub-channels" field informs the MSS of size information occupied by the "CQICH" region at an uplink in subchannel units.

Information transmitted via the secondary CQICH according to the present invention can be used in various ways according to feedback types. For example, if information associated with a Signal-to-Noise Ratio (SNR) is transmitted to the base station, a payload of the above-mentioned information may occur as depicted in the following Equation 2:

$$\text{4bit payload bit nibble} = \begin{cases} 0, & S/N < -2\text{dB} \\ n, & 2n - 4 < S/N < 2n - 2, \ 0 < n < 15 \\ 15, & S/N > 26\text{dB} \end{cases} \quad [\text{Equation 2}]$$

Meanwhile, in the case of a Multi-Input Multi-Output (MIMO) mode, a payload depicted in the following Table 18 may occur.

TABLE 18

| Value | Description |
|---|---|
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Closed-loop SM and PUSC/FUSC permutation |
| 0b0101 | Closed-loop SM and adjacent-subcarrier permutation |
| 0b0110 | Closed-loop SM + Beamforming and adjacent-subcarrier permutation |
| 0b0111-0b1111 | Interpretation according to table 296e, 296f or 296g, depending on if antenna grouping, antenna selection or a reduced precoding matrix code book is used. |

The following Table 19 exemplarily shows antenna grouping methods corresponding to individual values shown in Table 18.

TABLE 19

| Value | Description |
|---|---|
| 0b0111 | Antenna Group A1 for rate 1 |
| | For 3-antenna BS, See 8.4.8.3.4 |
| | For 4-antenna BS, See 8.4.8.3.5 |
| 0b1000 | Antenna Group A2 for rate 1 |
| 0b1001 | Antenna Group A3 for rate 1 |
| 0b1010 | Antenna Group B1 for rate 2 |
| | For 3-antenna BS, See 8.4.8.3.4 |
| | For 4-antenna BS, See 8.4.8.3.5 |
| 0b1011 | Antenna Group B2 for rate 2 |
| 0b1100 | Antenna Group B3 for rate 2 |
| 0b1101 | Antenna Group B4 for rate 2 (only for 4-antenna BS) |
| 0b1110 | Antenna Group B5 for rate 2 (only for 4-antenna BS) |
| 0b1111 | Antenna Group B6 for rate 2 (only for 4-antenna BS) |

The following Table 20 exemplarily shows antenna selection methods corresponding to individual values shown in Table 18.

TABLE 20

| Value | Description |
| --- | --- |
| 0b0111 | Antenna selection option 0 |
| 0b1000 | Antenna selection option 1 |
| 0b1001 | Antenna selection option 2 |
| 0b1010 | Antenna selection option 3 |
| 0b1011 | Antenna selection option 4 |
| 0b1100 | Antenna selection option 5 |
| 0b1101 | Antenna selection option 6 |
| 0b1110 | Antenna selection option 7 |
| 0b1111 | Reserved |

The following Table 21 exemplarily shows a method for employing reduced precoding matrix code books corresponding to individual values shown in Table 18.

TABLE 21

| Value | Description |
| --- | --- |
| 0b0111 | Reduced Precoding matrix code book entry 0 |
| 0b1000 | Reduced Precoding matrix code book entry 1 |
| 0b1001 | Reduced Precoding matrix code book entry 2 |
| 0b1010 | Reduced Precoding matrix code book entry 3 |
| 0b1011 | Reduced Precoding matrix code book entry 4 |
| 0b1100 | Reduced Precoding matrix code book entry 5 |
| 0b1101 | Reduced Precoding matrix code book entry 6 |
| 0b1110 | Reduced Precoding matrix code book entry 7 |
| 0b1111 | Reserved |

The base station transmits information associated with the above-mentioned feedback type information to an MSS via a "CQICH_Enhanced_Alloc_IE" field.

The following Tables 22 and 23 exemplarily show some parts of the "CQICH_Enhanced_Alloc_IE" field including the above-mentioned feedback type information.

TABLE 22

```
CQICH_Enhanced_Alloc_IE( ){
...                        ...    ...
Feedback type              3 bits 0b000 = Fast DL Measurement
                                  0b001 = MIMO Mode selection/Antenna Grouping
                                  0b010 = MIMO Mode selection/Antenna Selection
                                  0b011 = MIMO Mode Selection/Reduced Codebook
                                  0b100 = Quantized Precoding Weight Feedback
                                  0b101 = Index to Precoding Matrix in Codebook
                                  0b110 = Channel Matrix Information
                                  0b111 = Per Stream Power Control
...                        ...    ...
```

TABLE 23

```
CQICH_Enhanced_Alloc_IE( ){
...                       ...   ...
Feedback type             3 bits 0b000 = Fast DL measurement/Antenna grouping
                                     for 6bit payload
                                 = Fast DL measurement for 4bit payload
                                 0b001 = Fast DL measurement/Antenna selection
                                     for 6bit payload
                                 = MIMO mode/Antenna grouping for 4bit
                                     payload
                                 0b010 = Fast DL measurement/Reduced codebook
                                     for 6bit payload
                                 = Antenna selection/Reduced Codebook for
                                     4bit payload
                                 0b011 = Quantized precoding weight feedback
                                 0b100 = Index to precoding matrix in codebook
                                 0b101 = Channel Matrix Information
                                 0b110 = Per stream power control
                                 0b111 = reserved
```

Meanwhile, if only information associated with the SNR is transmitted to the base station, a payload of information transmitted via the secondary CQICH according to the present invention may occur as depicted in the following Equation 3:

$$4\text{bit payload bit nibble} = \begin{cases} 0, & S/N < -2\text{dB} \\ n, & 2n-4 < S/N < 2n-2, \ 0 < n < 15 \\ 15, & S/N > 26\text{dB} \end{cases} \quad [\text{Equation 3}]$$

Information associated with feedback types capable of transmitting only SNR-associated information to the base station is transmitted to the MSS via the "CQICH_Enhanced_Alloc_IE" field.

The following Table 24 exemplarily shows some parts of the "CQICH_Enhanced_Alloc_IE" field including the above-mentioned feedback type information.

TABLE 24

```
CQICH_Enhanced_Alloc_IE( ){
...                      ...      ...
Feedback type            3 bits   0b000 = Fast DL measurement/Antenna
                                  grouping for 6bit payload
                                  = Fast DL measurement for 4bit
                                  payload
                                  0b001 = Fast DL measurement/Antenna
                                  selection for 6bit payload
                                  = Fast DL measurement for 4bit payload
                                  0b010 = Fast DL measurement/Reduced
                                  codebook for
                                  6bit payload
                                  = Fast DL measurement for 4bit payload
                                  0b011 = Quantized precoding weight
                                  feedback
                                  0b100 = Index to precoding matrix in codebook
                                  0b101 = Channel Matrix Information
                                  0b110 = Per stream power control
                                  0b111 = reserved
...                      ...      ...
```

Meanwhile, information transmitted via the secondary CQICH can be used in various ways according to feedback types. In other words, the above-mentioned secondary CQICH can be used only for MIMO mode selection. If the secondary CQICH is used only for the MIMO mode selection, a payload may occur as shown in the following Table 25.

TABLE 25

| Value | Description |
| --- | --- |
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Closed-loop SM and PUSC/FUSC permutation |
| 0b0101 | Closed-loop SM and adjacent-subcarrier permutation |
| 0b0110 | Closed-loop SM + Beamforming and adjacent-subcarrier permutation |
| 0b0111-0b1111 | Interpretation according to table 296e, 296f or 296g, depending on if antenna grouping, antenna selection or a reduced precoding matrix code book is used. |

The following Table 26 exemplarily shows antenna grouping methods corresponding to individual values shown in Table 25.

TABLE 26

| Value | Description |
| --- | --- |
| 0b0111 | Antenna Group A1 for rate 1 |
|  | For 3-antenna BS, See 8.4.8.3.4 |
|  | For 4-antenna BS, See 8.4.8.3.5 |
| 0b1000 | Antenna Group A2 for rate 1 |
| 0b1001 | Antenna Group A3 for rate 1 |
| 0b1010 | Antenna Group B1 for rate 2 |
|  | For 3-antenna BS, See 8.4.8.3.4 |
|  | For 4-antenna BS, See 8.4.8.3.5 |
| 0b1011 | Antenna Group B2 for rate 2 |
| 0b1100 | Antenna Group B3 for rate 2 |
| 0b1101 | Antenna Group B4 for rate 2 (only for 4-antenna BS) |
| 0b1110 | Antenna Group B5 for rate 2 (only for 4-antenna BS) |
| 0b1111 | Antenna Group B6 for rate 2 (only for 4-antenna BS) |

The following Table 27 exemplarily shows antenna grouping methods corresponding to individual values shown in Table 25.

TABLE 27

| Value | Description |
| --- | --- |
| 0b0111 | Antenna selection option 0 |
| 0b1000 | Antenna selection option 1 |
| 0b1001 | Antenna selection option 2 |
| 0b1010 | Antenna selection option 3 |
| 0b1011 | Antenna selection option 4 |
| 0b1100 | Antenna selection option 5 |
| 0b1101 | Antenna selection option 6 |
| 0b1110 | Antenna selection option 7 |
| 0b1111 | Reserved |

The following Table 28 exemplarily shows a method for employing reduced precoding matrix code books corresponding to individual values shown in Table 25.

TABLE 28

| Value | Description |
| --- | --- |
| 0b0111 | Reduced Precoding matrix code book entry 0 |
| 0b1000 | Reduced Precoding matrix code book entry 1 |
| 0b1001 | Reduced Precoding matrix code book entry 2 |
| 0b1010 | Reduced Precoding matrix code book entry 3 |
| 0b1011 | Reduced Precoding matrix code book entry 4 |
| 0b1100 | Reduced Precoding matrix code book entry 5 |
| 0b1101 | Reduced Precoding matrix code book entry 6 |
| 0b1110 | Reduced Precoding matrix code book entry 7 |
| 0b1111 | Reserved |

The base station transmits information associated with the above-mentioned feedback type information to an MSS via the "CQICH_Enhanced_Alloc_IE" field.

The following Table 29 exemplarily shows some parts of the "CQICH_Enhanced_Alloc_IE" field including the above-mentioned feedback type information.

TABLE 29

| CQICH_Enhanced_Alloc_IE( ){ | | |
|---|---|---|
| ... | ... | ... |
| Feedback type | 3 bits | 0b000 = Fast DL measurement/Antenna grouping for 6bit payload<br>= MIMO mode/Antenna grouping for 4bit payload<br>0b001 = Fast DL measurement/Antenna selection for 6bit payload<br>= MIMO mode/Antenna selection for 4bit payload<br>0b010 = Fast DL measurement/Reduced codebook for 6bit payload<br>= MIMO mode/Reduced codebook for 4bit payload<br>0b011 = Quantized precoding weight feedback<br>0b100 = Index to precoding matrix in codebook<br>0b101 = Channel Matrix Information<br>0b110 = Per stream power control<br>0b111 = reserved |
| ... | ... | ... |

Although the use of the secondary fast feedback channel is requested by the BS to the MSS, the MSS has an option to request the usage by sending a request message to the BS. As apparent from the above description, a method for receiving a non-coherent detectable signal in a broadband wireless access system according to the present invention can transmit other signal(s) instead of a pilot signal when signal detection can be performed according to the non-coherent detection scheme, resulting in the implementation of increased transmission efficiency.

Although the present invention is described in the context of mobile communication, the present invention may also be used in any wireless communication systems using mobile devices, such as PDAs and laptop computers equipped with wireless communication capabilities.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Figure 9A:
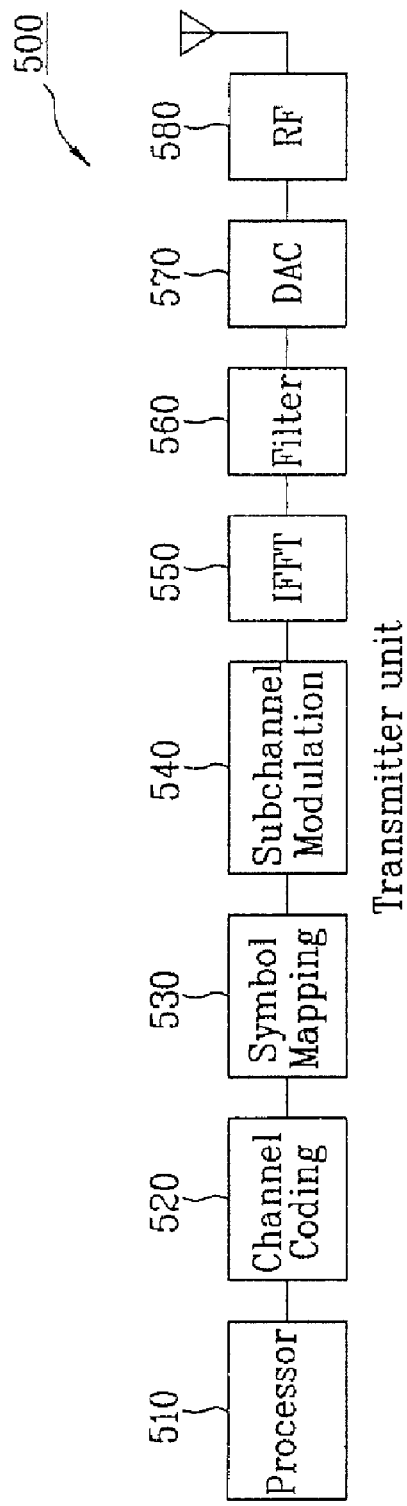
FIGS. 9A and 9B illustrate a structure of a transmitter unit and receiver unit of a mobile communication device in accordance with one embodiment of the present invention.
Figure 9B:
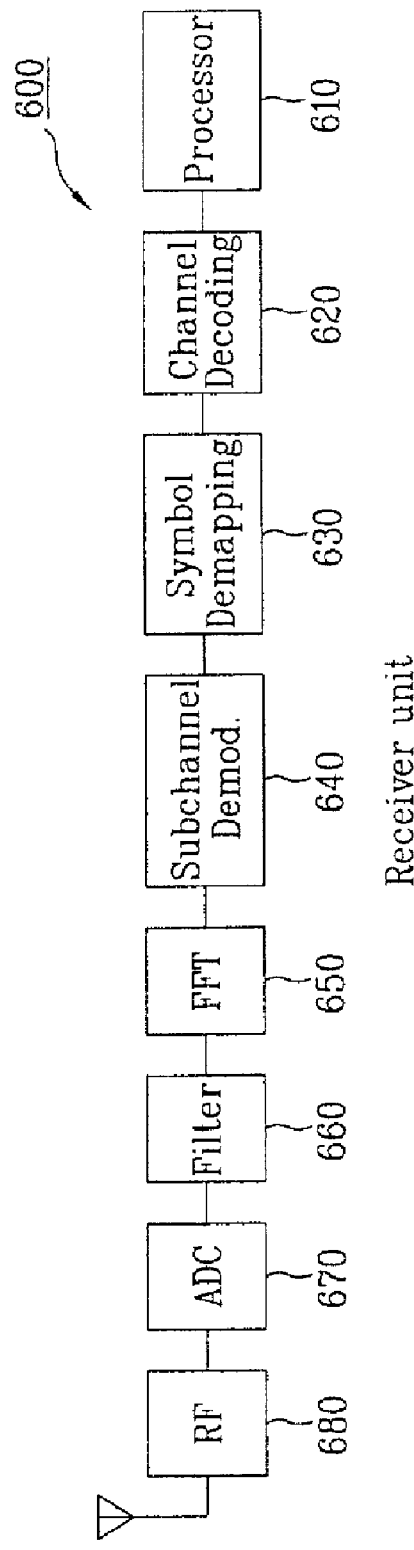

FIGS. 9A and 9B illustrate a structure of a transmitter unit and receiver unit of a mobile communication device in accordance with one embodiment of the present invention. Referring to FIG. 9A, a transmitter unit 500 preferably comprises a processor 510 for processing a signal to be transmitted. Before transmission, data bits are channel coded in a channel coder 520, wherein redundancy bits are added to data bits. The data bits are then mapped to a signal such as QPSK or 16QAM in a symbol mapper 530. Subsequently, the signal goes through subchannel modulation in a subchannel modulator 540 wherein the signal is mapped to the OFDMA subcarriers. Afterward, an OFDM waveformed-signal is constructed by combining several subcarriers through an Inverse Fast Fourier Transform (IFFT) 550. Finally, the signal is filtered through filter 560, converted to an analog signal by a digital-to-analog converter (DAC) 570 and transmitted to a receiver by an RF module 580.

Referring to FIG. 9B, a structure of a receiver 600 of the present invention is similar to that of the transmitter 500; however, the signal goes through a reverse process. Preferably, a signal is received by an RF module 680 and subsequently converted to a digital signal by an analog-to-digital converter 670 and filtered through filter 660. Upon filtering, the signal goes through a Fast Fourier Transform (FFT) 650 for deconstructing the waveformed-signal. The signal is then subchannel demodulated in subchannel demodulator 640, symbol demapped by symbol demapper 630 and channel decoded by channel decoder 620 prior to being forwarded to a processor 610 for processing.

Preferably, when a user enters instructional information, such as a phone number, for example, into the mobile communication device by pushing buttons of a keypad or by voice activation using a microphone, the processor 510 or 610 receives and processes the instructional information to perform the appropriate function, such as to dial the telephone number. Operational data may be retrieved from a storage unit to perform the function. Furthermore, the processor 510 or 610 may display the instructional and operational information on a display for the user's reference and convenience.

The processor issues instructional information to the RF module 580 or 680, to initiate communication, for example, transmit radio signals comprising voice communication data. The RF module comprises a receiver and a transmitter to receive and transmit radio signals. An antenna facilitates the transmission and reception of radio signals. Upon receiving radio signals, the RF module may forward and convert the signals to baseband frequency for processing by the processor. The processed signals would be transformed into audible or readable information outputted via a speaker, for example.

The processor is adapted to store message history data of messages received from and messages transmitted to other users in the storage unit, receive a conditional request for message history data input by the user, process the conditional request to read message history data corresponding to the conditional request from the storage unit, and output the message history data to the display unit. The storage unit is adapted to store message history data of the received messages and the transmitted messages.

Figure 10A:
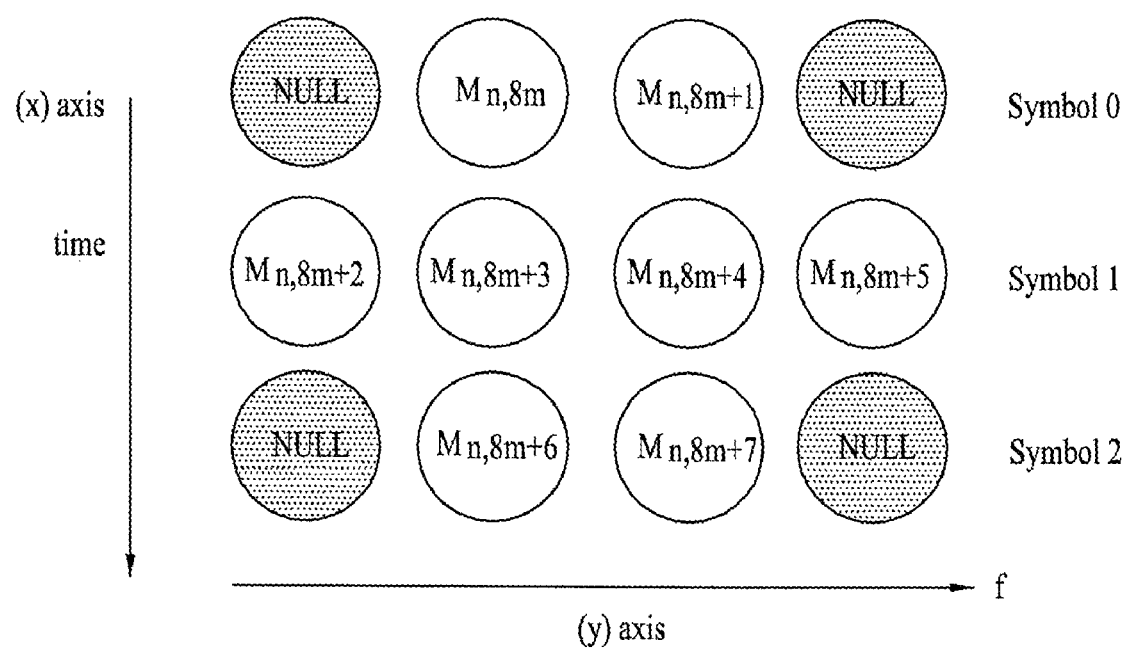
FIGS. 10A and 10B respectively illustrate an uplink channel primary tile and an uplink channel secondary tile, where the x-axis represents a time domain and a y-axis represents a frequency domain.
Figure 10B:
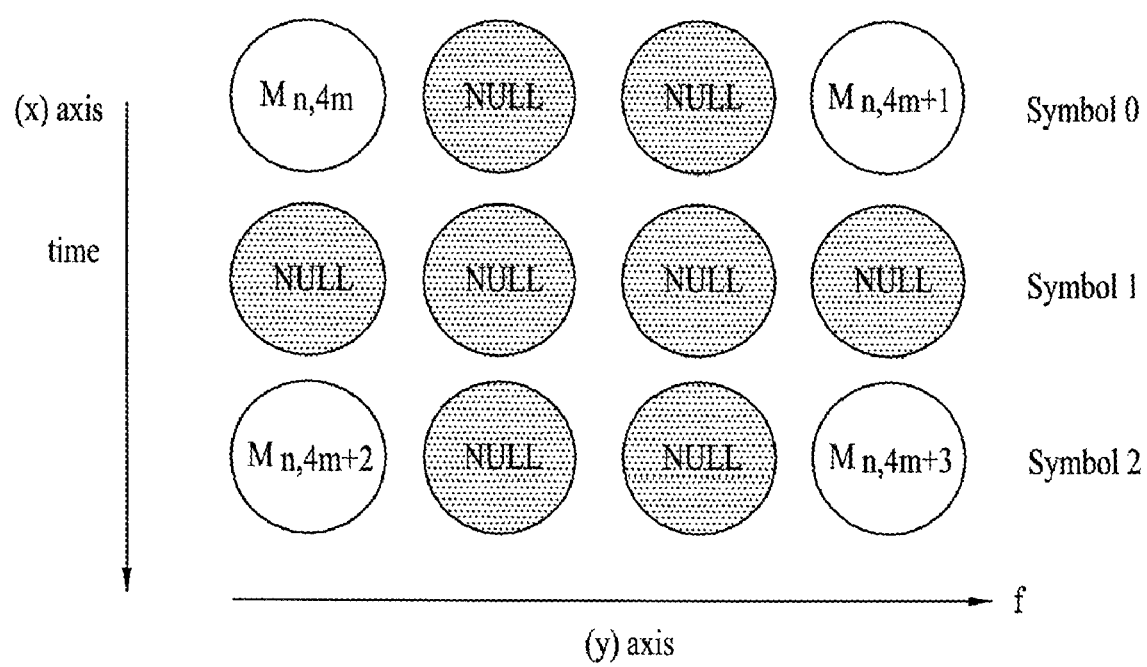

FIGS. 10A and 10B respectively illustrate an uplink channel primary tile and an uplink channel secondary tile, where the x-axis represents a time domain and a y-axis represents a frequency domain.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of allocating a radio resource in a wireless communication system utilizing orthogonal frequency division multiplexing (OFDM), the method comprising:

receiving in a mobile station a radio resource allocation map from a base station, wherein the radio resource allocation map comprises at least one of information elements (IEs) for controlling feedback transmission on an uplink channel, wherein the uplink channel on which the feedback is transmitted is a primary fast feedback channel if the uplink channel comprises six OFDM tiles of a first type OFDM tile, and wherein the uplink channel is a secondary fast feedback channel if the uplink channel comprises six OFDM tiles of a second type OFDM tile, wherein the primary fast feedback channel is associated with representing n-bit data payload, and the secondary fast feedback channel is associated with representing an m-bit data payload; and transmitting the feedback on the primary fast feedback channel or the secondary fast feedback channel from the mobile station to the base station, wherein the first type OFDM tile comprises:

|  | Subcarrier 0 | Subcarrier 1 | Subcarrier 2 | Subcarrier 3 |
|---|---|---|---|---|
| Symbol 0 | NULL | $M_{n,8m}$ | $M_{n,8m+1}$ | NULL |
| Symbol 1 | $M_{n,8m+2}$ | $M_{n,8m+3}$ | $M_{n,8m+4}$ | $M_{n,8m+5}$ |
| Symbol 2 | NULL | $M_{n,8m+6}$ | $M_{n,8m+7}$ | NULL | and wherein the second type OFDM tile comprises:

|  | Subcarrier 0 | Subcarrier 1 | Subcarrier 2 | Subcarrier 3 |
|---|---|---|---|---|
| Symbol 0 | $M_{n,4m}$ | NULL | NULL | $M_{n,4m+1}$ |
| Symbol 1 | NULL | NULL | NULL | NULL |
| Symbol 2 | $M_{n,4m+2}$ | NULL | NULL | $M_{n,4m+3}$ |

2. The method of claim 1, wherein the n-bit data payload is a 6-bit data payload.

3. The method of claim 1, wherein the m-bit data payload is a 4-bit data payload.

4. The method of claim 1, wherein the at least one of information elements is a Channel Quality Indication Channel (CQICH) Enhanced allocation IE.

5. The method of claim 4, wherein the secondary fast feedback channel represents the 4-bit data payload as follows:

| 4 bit payload | Vector indices per tile Tile(0), Tile(1), Tile(2), Tile(3), Tile(4), Tile(5) |
|---|---|
| 0b0000 | a, a, a, b, b, b |
| 0b0001 | b, b, b, a, a, a |
| 0b0010 | c, c, c, d, d, d |
| 0b0011 | d, d, d, c, c, c |
| 0b0100 | a, b, c, d, a, b |
| 0b0101 | b, c, d, a, b, d |
| 0b0110 | c, d, a, b, c, d |
| 0b0111 | d, a, b, c, d, a |
| 0b1000 | a, a, b, d, c, c |
| 0b1001 | b, d, c, c, d, b |
| 0b1010 | c, c, d, b, a, a |
| 0b1011 | d, d, b, a, b, b |
| 0b1100 | a, a, d, c, a, d |
| 0b1101 | b, c, a, c, c, a |
| 0b1110 | c, b, d, d, b, c |
| 0b1111 | d, c, c, b, b, c | wherein

| Vector Index | $M_{n,4m}$, $M_{n,4m+1}$, $M_{n,4m+2}$, $M_{n,4m+3}$ |
|---|---|
| a | P0, P0, P0, P0 |
| b | P0, P2, P0, P2 |
| c | P0, P1, P2, P3 |
| d | P1, P0, P3, P2 | where P0, P1, P2, and P3 are denoted as follows:

$$P0 = \exp\left(j\frac{\pi}{4}\right),$$

$$P1 = \exp\left(j\frac{3\pi}{4}\right),$$

$$P2 = \exp\left(-j\frac{3\pi}{4}\right) \text{ and}$$

$$P3 = \exp\left(-j\frac{\pi}{4}\right).$$

6. The method of claim 4, wherein the CQICH Enhanced Allocation IE comprises feedback type.

7. The method of claim 3, wherein the 4-bit data payload indicates antenna selection option and reduced precoding matrix codebook entry dependent on a value of the represented 4-bit data payload.

8. A mobile communication device for allocating a radio resource in a wireless communication system utilizing orthogonal frequency division multiplexing (OFDM), the mobile communication device comprising:

a processor for processing a radio resource allocation map received from a base station, wherein the radio resource allocation map comprises at least one of information elements for controlling feedback transmission on an uplink channel, wherein the uplink channel on which the feedback is transmitted is a primary fast feedback channel if the uplink channel comprises six OFDM tiles of a first type OFDM tile, and wherein the uplink channel is a secondary fast feedback channel if the uplink channel comprises six OFDM tiles of a second type OFDM tile, wherein the primary fast feedback channel is associated with representing an n-bit data payload, and the secondary fast feedback channel is associated with representing an m-bit data payload; and a transmitter module for transmitting the feedback on the primary fast feedback channel or the secondary fast feedback channel to the base station, wherein the first type OFDM tile comprises:

|  | Subcarrier 0 | Subcarrier 1 | Subcarrier 2 | Subcarrier 3 |
|---|---|---|---|---|
| Symbol 0 | NULL | $M_{n,8m}$ | $M_{n,8m+1}$ | NULL |
| Symbol 1 | $M_{n,8m+2}$ | $M_{n,8m+3}$ | $M_{n,8m+4}$ | $M_{n,8m+5}$ |
| Symbol 2 | NULL | $M_{n,8m+6}$ | $M_{n,8m+7}$ | NULL | and wherein the second type OFDM tile comprises:

|  | Subcarrier 0 | Subcarrier 1 | Subcarrier 2 | Subcarrier 3 |
|---|---|---|---|---|
| Symbol 0 | $M_{n,4m}$ | NULL | NULL | $M_{n,4m+1}$ |
| Symbol 1 | NULL | NULL | NULL | NULL |
| Symbol 2 | $M_{n,4m+2}$ | NULL | NULL | $M_{n,4m+3}$ |

9. The mobile communication device of claim 8, wherein the n-bit data payload is a 6-bit data payload.

10. The mobile communication device of claim 8, wherein the m-bit data payload is a 4-bit data payload.

11. The mobile communication device of claim 8, wherein the at least one of information elements is a Channel Quality Indication Channel (CQICH) Enhanced allocation IE.

12. The mobile communication device of claim 11, wherein the secondary fast feedback channel represents the 4-bit data payload as follows:

| 4 bit payload | Vector indices per tile Tile(0), Tile(1), Tile(2), Tile(3), Tile(4), Tile(5) |
|---|---|
| 0b0000 | a, a, a, b, b, b |
| 0b0001 | b, b, b, a, a, a |
| 0b0010 | c, c, c, d, d, d |
| 0b0011 | d, d, d, c, c, c |
| 0b0100 | a, b, c, d, a, b |
| 0b0101 | b, c, d, a, b, d |
| 0b0110 | c, d, a, b, c, d |
| 0b0111 | d, a, b, c, d, a |
| 0b1000 | a, a, b, d, c, c |
| 0b1001 | b, d, c, c, d, b |
| 0b1010 | c, c, d, b, a, a |
| 0b1011 | d, d, b, a, b, b |
| 0b1100 | a, a, d, c, a, d |
| 0b1101 | b, c, a, c, c, a |
| 0b1110 | c, b, d, d, b, c |
| 0b1111 | d, c, c, b, b, c | wherein

| Vector Index | $M_{n,4m}, M_{n,4m+1}, M_{n,4m+2}, M_{n,4m+3}$ |
|---|---|
| a | P0, P0, P0, P0 |
| b | P0, P2, P0, P2 |
| c | P0, P1, P2, P3 |
| d | P1, P0, P3, P2 | where P0, P1, P2, and P3 are denoted as follows:

$$P0 = \exp\left(j\frac{\pi}{4}\right),$$

$$P1 = \exp\left(j\frac{3\pi}{4}\right),$$

$$P2 = \exp\left(-j\frac{3\pi}{4}\right) \text{ and}$$

$$P3 = \exp\left(-j\frac{\pi}{4}\right).$$

13. The mobile communication device of claim 11, wherein the CQICH Enhanced Allocation IE comprises feedback type.

14. The mobile communication device of claim 10, wherein the 4-bit data payload indicates antenna selection option and reduced precoding matrix codebook entry dependent on a value of the represented 4-bit data payload.

* * * * *